May 2, 1967  G. A. PETERSEN  3,316,988
AUGER HEAD WITH THREE RADIAL ARMS
Filed Sept. 21, 1964  2 Sheets-Sheet 1
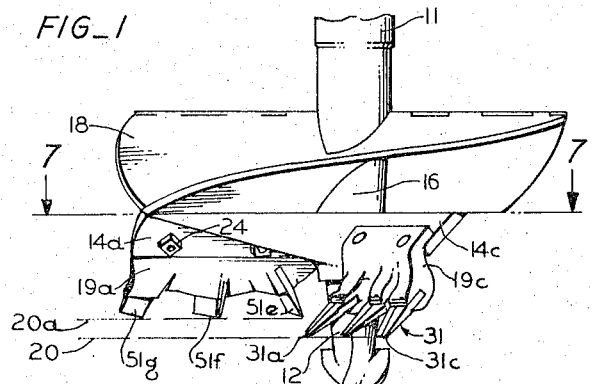
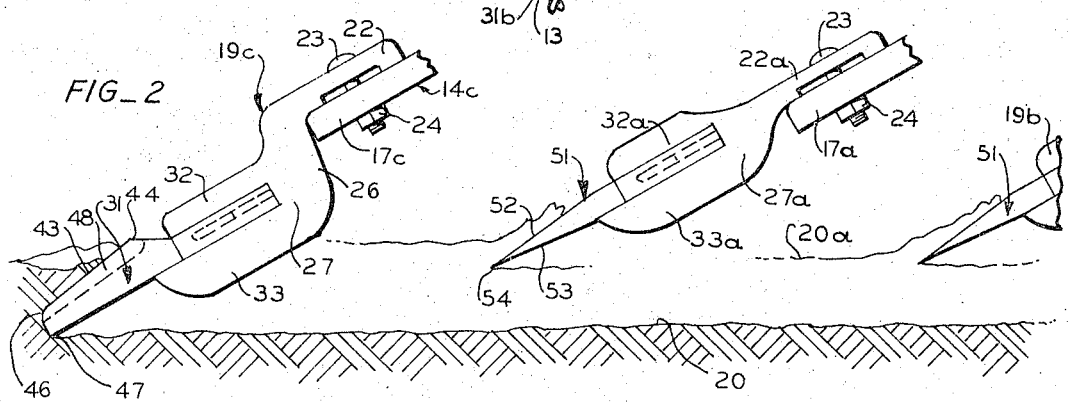
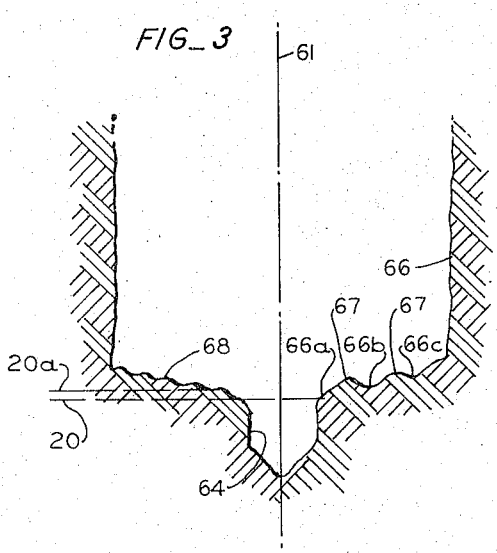
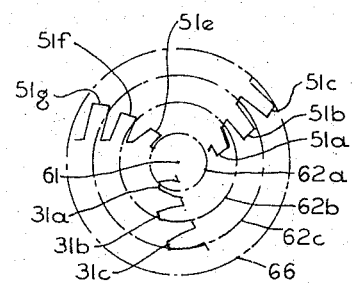
INVENTOR.
GERALD A. PETERSEN
BY
Julian Caplan
ATTORNEY May 2, 1967   G. A. PETERSEN   3,316,988
AUGER HEAD WITH THREE RADIAL ARMS
Filed Sept. 21, 1964   2 Sheets-Sheet 2
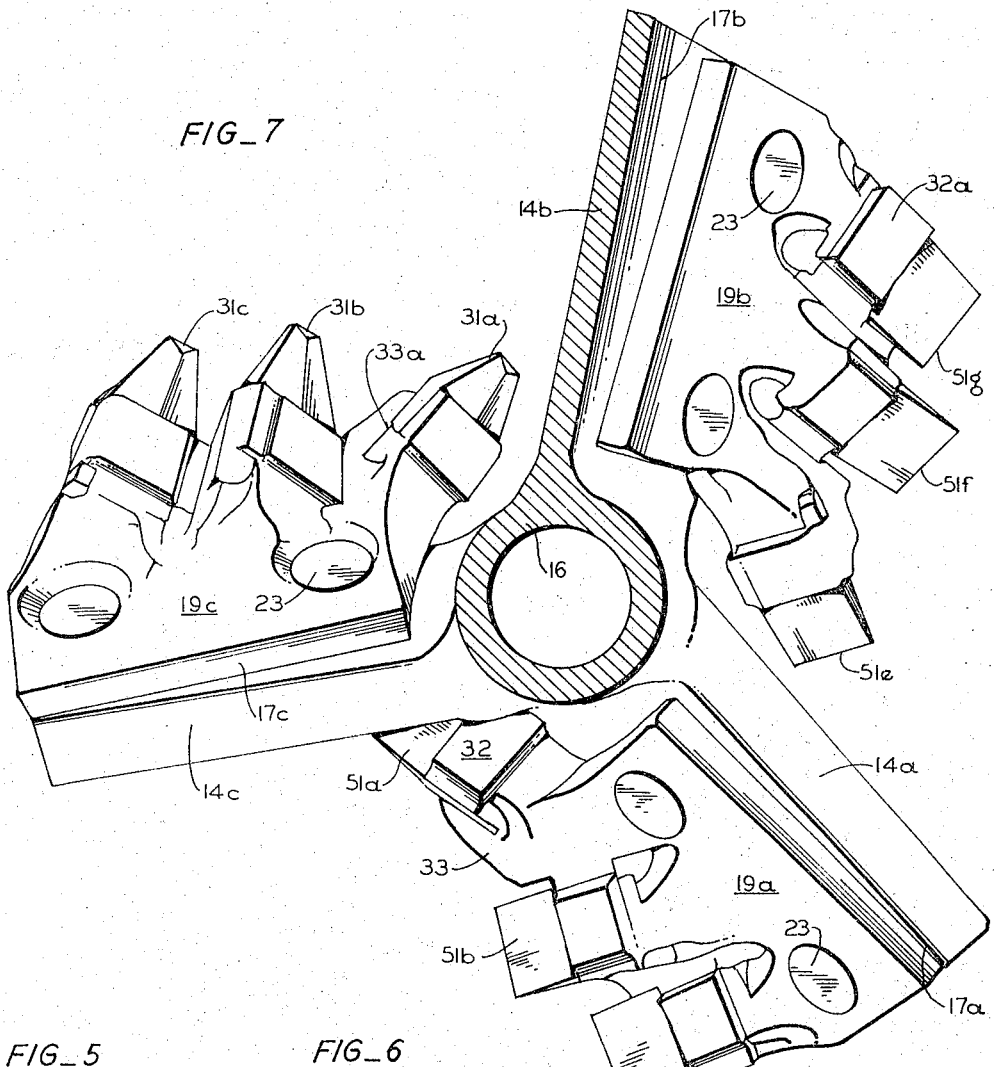
FIG_7
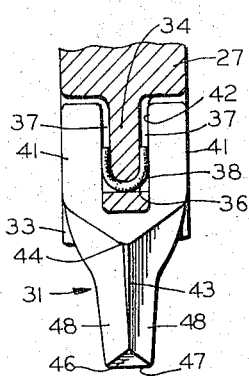
FIG_5
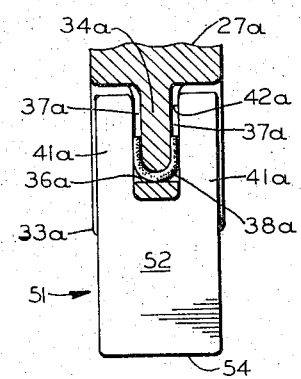
FIG_6
INVENTOR.
GERALD A. PETERSEN
BY
*Julian Caplan*
ATTORNEY United States Patent Office 3,316,988
Patented May 2, 1967

3,316,988
AUGER HEAD WITH THREE RADIAL ARMS
Gerald A. Petersen, Sunnyvale, Calif., assignor of one-half to Anita E. Petersen, Saratoga, Calif.
Filed Sept. 21, 1964, Ser. No. 397,708
4 Claims. (Cl. 175—391)

This invention relates to a new and improved auger head with three radial arms, and comprises an improvement on Patent No. 2,578,014. The latter patent discloses an auger head with two diametrically opposed arms, each arm carrying a plurality of teeth. A principal advantage of the design of said patent is to provide two substantially equal cutting areas which balance the load so that the auger does not tend to divert from a straight line, nor is it thrust against the side of the hole. Maintenance costs of the drilling equipment are reduced and the use of back thrust shoes is eliminated.

Said patent also discloses that the teeth are positioned in a particular pattern whereby the tooth nearest the central axis located on the first of the two arms is lowermost; the tooth next nearest to the central axis is on the opposite arm and is spaced outwardly from the axis an increment about equal to the width of the furrow cut by the first tooth. The teeth are alternated from arm to arm with respect to distance from the axis and such staggered construction insures that the entire cross-sectional area of the hole being dug will be traversed by one or the other of the teeth. In addition to the foregoing advantages, the staggered construction reduced the amount of power required to turn the auger during digging.

The foregoing, as well as other advantages not herein mentioned have resulted in a widespread commercial success of augers constructed in accordance with the foregoing principles. The present invention incorporates the advantages of the aforementioned patent as well as additional advantages. In the first place, instead of the two arms the present invention has three approximately equi-angularly spaced arms. Such arrangement imparts additional stability to the auger since forces tending to divert the auger from a straight path are counter-balanced by two arms rather than one. In effect, the auger forms a tripod arrangement. Thus, assume that one or more teeth of one of the arms strikes a large rock or other resistance. The presence of two additional arms as distinguished from a single additional arm more effectively counteracts the resulting forces tending to divert the auger from its true path.

It is understood, of course, that some drilling bits for well drilling, for example, have used three cutters or cones. However, such implements are of relatively small diameter and do not involve the use of radial arms with a plurality of teeth spaced along each arm and generally function in a quite different manner and do not possess the advantages heretofore disclosed.

Still another feature of the invention is the fact that the teeth on one arm are lower than the level of the corresponding teeth on the other two arms. Thus, the lowermost teeth on the first mentioned arm dig concentric furrows with gaps between the center lines of the furrows slightly wider than the width of each furrow. The other two arms have teeth spaced from the axis intermediate the teeth on the first arm and cut away the ridges between adjacent furrows cut by teeth on the first arm. Improved penetration, particularly of hard and compact soils, is thus achieved because the teeth on one side rip the soil and the teeth on the other side clear or smooth the soil prior to the next ripping contact. This arrangement makes it possible to dig in soils for installation of utility poles, transmission tower footings, and similar jobs with a rapidity, efficiency and low power requirement never heretofore achieved.

A still further requirement of the foregoing advantage of the invention is the fact that the teeth of the second and third arms are spaced so that they cut alternately into the inside and outside, respectively, of the ridges between furrows cut by the first mentioned teeth.

In a preferred embodiment of the invention the set of teeth on the lowermost arm are of the construction shown in Patent No. 3,136,077. Such teeth have a ripping or explosive action relative to very hard and compact soils which is highly effective and enables earth augers to be used in areas where they have not been used successfully previously. Further, in said preferred embodiment the teeth on the second and third arms are of the type shown in Patents Nos. 2,877,574, 2,952,085 and 2,968,880. The broader cutting edges of the latter teeth are effective in slicing off the ridges between the furrows dug by the more sharply-pointed teeth of Patent No. 3,136,077.

Other objects of the present invention will become apparent upon reading the following specification and referring to the accompanying drawings in which similar characters of reference represent corresponding parts in each of the several views.

In the drawings:

FIG. 1 is a front elevational view of an auger constructed in accordance with this invention.

FIG. 2 is a schematic side elevational view showing the digging of a hole in accordance with the present invention and showing in fragmentary form the outline of the teeth which perform the digging operation.

FIG. 3 is a schematic, cross-sectional view through a hole dug in accordance with the present invention and showing the furrows cut by the respective teeth.

FIG. 4 is a schematic, bottom plan view of the auger showing the staggered relationship of the teeth on the arms thereof.

FIG. 5 is a fragmentary, sectional view taken substantially along the line 5—5 of FIG. 2.

FIG. 6 is a fragmentary, sectional view taken substantially along the line 6—6 of FIG. 2.

FIG. 7 is an enlarged sectional view taken substantially along line 7—7 of FIG. 1.

The auger head which is the subject of this invention has a central shaft or stem 11 to the lower end of which is attached by means of a connector 12, such as that connector shown in Patent No. 2,870,995, a pilot bit 13 such as that shown in Patent No. 2,773,673. Welded to hub 16 on stem 11, or formed integrally therewith are three equi-angularly spaced radial arms 14a, 14b, 14c. Each arm 14 has a downwardly, forwardly slanted flight portion 17a, 17b, 17c, having a shape similar to a short section of a helix. One of the arms has an upwardly extending ramp 18 which may be welded to the lower end of the flight of a helical auger (not shown). The use of such ramp 18 is optional.

Bolted to each of the flight portions 17 of the head is a tooth holder 19a, 19b, 19c to accommodate a plurality of teeth. In the form of the invention herein illustrated there are three teeth for each holder, but such number is subject to variation.

Tooth holder 19c is different from the other two in that it has a downward offset which makes teeth held by this particular holder lower than the teeth on the other two arms. Contrast horizontal lines 20, 20a representing the planes through the lowermost or innermost teeth of arms 14c as compared with corresponding teeth of either arms 14a or 14b. Thus, on arm 14c tooth holder 19c has an upper pad 22 which conforms to the curvature and angularity of flight 17c and is apertured, as is flight 17c for the reception of bolts 23 which, together with nuts 24, hold pad 22 on flight 17c. The intermediate portion 26 of holder 19c is bent downwardly at approximately a 90° angle with respect to upper pad 22, a distance of approximately one inch. The lower portion 27 is bent downwardly, forwardly approximately parallel to the upper pad 22. This construction provides the downward offset of holder 19c which has heretofore been mentioned. The holders 19a, 19b on the other two arms eliminate the intermediate portion 26. In other words, the upper pad 22a is stepped and apertured for fastening to flight 17a by means of bolts 23 and the lower portion 27a merely constitutes an extension of upper pad 22a.

Each of the tooth holders 19 is provided with means for securing in position a plurality of cutting teeth. The teeth 31 on tooth holder 19c are preferably of the particular shape shown in Patent No. 3,136,077, and the means of attachment of said teeth to tooth holder 19c is as shown in FIGS. 5 and 6 of said patent. Tooth holder 19c is formed with an H-shaped attachment means consisting of top and bottom members 32, 33 and an interconnecting web 34. Web 34 is formed with a transverse hole 36 and the sides of web 34 rearwardly of the hole 36 are formed with grooves 37. A short key 38 of resilient material, such as rubber or neoprene, extends through hole 36 and is bent backwardly along grooves 37. Tooth 31 is formed with approximately rectangular cross-section prongs 41 at the proximal end thereof divided by a slot 42 extending forwardly from the proximal end of the tooth. The distance between the sides of slot 42 is substantially equal to the thickness of web 34. Accordingly, the ends of key 38 bear against the substantially vertical side edges of slot 42 and retain tooth 31 in holder 27 against unintentional dislodgment. The distal portion of tooth 31 is essentially as shown in said Patent No. 3,136,077, having a spine 43 which slopes upwardly from the forward end of the proximal portion at about a 45° angle to a peak at about one-fourth of the distance forward of the proximal end of the tooth and then slopes downwardly-forwardly at a 30° angle toward the front end 47 of the tooth. The thickness of tooth 31 at peak 44 is about twice that at prongs 41 at the proximal end of the tooth and at the front end about one-half that at the proximal end of the tooth. The surface 46 between the front end of spine 43 and the forward end 47 of the tooth is beveled in a triangular shape. The flanks 48 of spine 43 are curved in arcuate surfaces of relatively large radius.

The teeth 51 on the other two arms 14a, 14b are as shown in Patent No. 3,057,091, or that form shown in Patent No. 2,877,574, or in FIGS. 1 to 9, inclusive, of Patent No. 2,952,085. The means of attachment of teeth 51 to holders 27a, 27b is substantially identical with that shown in FIG. 5 for tooth 31 and the same reference numerals followed by the subscript a are used to represent corresponding parts. Teeth 51 have forwardly converging top and bottom distal surfaces 52, 53 truncated by transverse end 54 providing top and bottom reversible cutting edges extending across the entire width of the tooth, as contrasted with the narrow cutting edge 47 of tooth 31.

Directing attention now to FIG. 4, the reference numeral 61 represents the central axis of stem 11. A series of concentric circles 62a, 62b, 62c are at equally spaced intervals from axis 61, the spacing between circles 62 being approximately twice the width of end 54 of tooth 51. Circle 66 represents the outside diameter of the hole cut by the auger. The pilot bit digs a hole 64 having a diameter substantially equal to circle 62a. As shown in the accompanying drawings and as herein described, there are three teeth 31a, 31b, 31c, connected to tooth holder 17c. The innermost tooth 31a is centered at circle 62a, tooth 31b at circle 62b, and tooth 31c at circle 62c.

Further, each successive tooth 31 proceeding outwardly has its lowermost point a slight distance higher than the preceding tooth (see FIG. 3), so that the bottom of the hole 66 slopes outwardly-upwardly (ignoring the central hole 64 formed by the pilot bit). Directing attention to FIGS. 1, 4 and 7, it will be seen that the direction which each tooth 31 assumes in plan is at a varying angle with relation to a radial line from axis 61 as compared with adjacent teeth, the teeth being tangent to the respective circles 62a to 62c. Further, the cutting edges 47 of the teeth 31 assume different angles with relation to a horizontal plane. In other words, each tooth 31 is slightly twisted about its longitudinal axis so that when the auger is rotated the teeth 31 cut angular surfaces relative to each other. A feature of the construction is that at least the two lowermost teeth 31a, 31b of the third arm are lower than the lowermost tooth of any of the other arms. Preferably, all three teeth 31a, 31b, 31c are lower than any of the teeth on the other two arms.

The teeth 51a, 51b, 51c on the second arm 17a are staggered relative to teeth 31. Again referring to FIG. 4, the first tooth 51a on arm 14a is located between circles 62a and 62b, so that the outer corner of its cutting edge is approximately on circle 62b, and similarly teeth 51b and 51c have their outer corners approximately on circles 62c and 66, respectively. On the other hand, each tooth 51e to 51g on arm 14b is so located that the inner corner of its cutting edge is on one of the circles. Thus, the inner corners of teeth 51e to 51g lie on circles 62a, 62b and 62c, respectively. The placement of the teeth is such that whereas teeth 31a to 31c leave furrows 66a to 66c (see FIG. 3), the teeth 51a to 51c of the second arm 14b cut off the outside of each ridge 67, and the teeth on third arm 14c cut off the inside of each such ridge 67 between furrows, leaving the resultant surface 68 quite smooth.

It will be understood that although the shape of teeth 31 differs from the shape of teeth 51, nevertheless, the invention contemplates that identical teeth may be used on each arm of the auger, namely, preferably the teeth 51 used on the second and third arms.

It will further be understood that although the third arm 14c is shown with a tooth holder 19c having a downwardly extending intermediate portion 26 so that the teeth 51 are lower than the teeth 31 on the other two arms 14a, 14b, nevertheless all of the teeth may be at the same level.

The construction of the present invention permits digging in highly compacted soils and in geographical areas which have hitherto resisted boring operations of this type. In a preferred form of the invention illustrated using teeth 31 and 51 of different shapes, furrows 66a, 66b, 66c, inclusive, are formed in the bottom of hole 66 with an explosive action which shatters highly compacted soils and the ridges 67 are cut off by teeth 51 on the other arms 14a, 14b of the auger. On the right-hand side of FIG. 3, there is a ripping action, and on the left-hand side there is a subsequent smoothing out of the ridges 67.

Although the foregoing invention has been described in some detail, by way of illustration and example for purposes of clarity of understanding, it is understood that certain changes and modifications may be practiced within the spirit of the invention and scope of the appended claims.

What is claimed is:

1. An auger head having a hub, first, second and third arms extending from said hub approximately radially and equiangularly in plan and slightly upwardly-outwardly in elevation, a first, second and third tooth holder detachably connected to said first, second and third arms, respectively, and each slanting downwardly, forwardly, said first holder bent downwardly and having its forward edge terminating at a lower elevation than said second and third holders, a first plurality of first tooth attachment means on said first holder spaced at different radial distances from the axis of said head, first teeth in each said first tooth attachment means positioned to dig concentric furrows separated by ridges as said head revolves, a second plurality of second tooth attachment means on said second holder, second teeth in each said second tooth attachment means, a third plurality of third tooth attachment means on said third holder, third teeth in each said third tooth attachment means, said second and third teeth being radially staggered relative to said first teeth to slice off said ridges left by said first teeth, said second and third teeth being higher in elevation than said first teeth, said second and third teeth being radially staggered relative to each other, whereby said second teeth slice off the insides of said ridges and said third teeth slice off the outsides of said ridges.

2. An auger head having a hub, first, second and third arms extending from said hub approximately radially and equiangularly in plan and slightly upwardly-outwardly in elevation, a first, second and third tooth holder connected to said first, second and third arms, respectively, and each slanting downwardly, forwardly, a first plurality of first tooth attachment means on said first holder spaced at different radial distances from the axis of said head, first teeth in each said first tooth attachment means positioned to dig concentric furrows separated by ridges as said head revolves, a second plurality of second tooth attachment means on said second holder, second teeth in each said second tooth attachment means, a third plurality of third tooth attachment means on said third holder, third teeth in each said third tooth attachment means, said second and third teeth being radially staggered relative to said first teeth to slice off said ridges left by said first teeth, said first teeth being pointed and formed with central spines on their top surfaces and said second and third teeth being broad and flat.

3. An auger head according to claim 2, in which at least two of said first teeth are lower than any of said second and third teeth.

4. An auger head having a hub, first, second and third arms extending from said hub approximately radially and equiangularly in plan and slightly upwardly-outwardly in elevation, a first, second and third tooth holder connected to said first, second and third arms, respectively, and each slating downwardly, forwardly, said first holder terminating at a lower elevation than said second and third holders, a first plurality of first tooth attachment means on said first holder spaced at different radial distances from the axis of said head, first teeth in each said first tooth attachment means positioned to dig concentric furrows separated by ridges as said head revolves, a second plurality of second tooth attachment means on said second holder, second teeth in each said second tooth attachment means, a third plurality of third tooth attachment means on said third holder, third teeth in each said third tooth attachment means, said second and third teeth being radially staggered relative to said first teeth to slice off said ridges left by said first teeth, said second and third teeth being higher in elevation than said first teeth, said first teeth being pointed and formed with central spines on their top surfaces and said second and third teeth are broad and flat.

References Cited by the Examiner
UNITED STATES PATENTS

| | | | |
|---|---|---|---|
| 1,826,087 | 10/1931 | Newman | 175—391 |
| 2,695,158 | 11/1954 | Hawthorne et al. | 175—391 |
| 2,701,126 | 2/1955 | McClennan | 175—391 |
| 2,705,128 | 3/1955 | McClennan | 175—391 |
| 2,800,302 | 7/1957 | McClennan | 175—391 |
| 3,235,018 | 2/1966 | Troeppl | 175—391 |

CHARLES E. O'CONNELL, *Primary Examiner.*

D. H. BROWN, *Assistant Examiner.*